United States Patent [19]

Hirschmann et al.

[11] 4,160,878
[45] Jul. 10, 1979

[54] CONFERENCE CIRCUIT WITH DIGITAL-ANALOG AND ANALOG-DIGITAL CONVERSION

[75] Inventors: Peter Hirschmann, Puchheim; Ernst Hoefer, Munich, both of Fed. Rep. of Germany

[73] Assignee: Siemens Aktiengesellschaft, Berlin & Munich, Fed. Rep. of Germany

[21] Appl. No.: 926,197

[22] Filed: Jul. 19, 1978

[30] Foreign Application Priority Data

Jul. 19, 1977 [DE] Fed. Rep. of Germany ....... 2732603
Aug. 5, 1977 [DE] Fed. Rep. of Germany ....... 2735401

[51] Int. Cl.² .............................................. H04M 3/56
[52] U.S. Cl. ................................................. 179/18 BC
[58] Field of Search ..................................... 179/18 BC

[56] References Cited

U.S. PATENT DOCUMENTS

| | | | |
|---|---|---|---|
| 4,048,449 | 9/1977 | Natebusch | 179/18 BC |
| 4,049,920 | 9/1977 | Knollman | 179/18 BC |
| 4,054,755 | 10/1977 | Lee et al. | 179/18 BC X |
| 4,056,820 | 11/1977 | Hofer | 340/347 C |
| 4,109,111 | 8/1978 | Cook | 179/18 BC |
| 4,119,807 | 10/1978 | Nahay | 179/18 BC |

Primary Examiner—William C. Cooper
Attorney, Agent, or Firm—Hill, Van Santen, Steadman, Chiara & Simpson

[57] ABSTRACT

A circuit arrangement is disclosed for converting digital signals into analog signals and analog signals into digital signals. The circuit arrangement is used as a conference set for use by individual subscribers on a multiplex line. Digital signals of all subscribers are consecutively converted into analog signals and an analog summation signal is formed therefrom. This summation signal is again converted back into a digital signal and can be multiply transmitted as such. Alternatively, a number n of circuit arrangements are provided for a maximum number n of subscribers. Each of the circuit arrangements converts digital signals of n-1 conference subscribers (excluding an allocated subscriber) into analog signals and forms an analog summation signal therefrom. This analog summation signal is converted back into a digital signal which is transmitted in a time slot allocated to the allocated conference subscriber to which the circuit arrangement is allocated.

6 Claims, 3 Drawing Figures

CONFERENCE CIRCUIT WITH DIGITAL-ANALOG AND ANALOG-DIGITAL CONVERSION

BACKGROUND OF THE INVENTION

The invention relates to a circuit arrangement for converting digital signals, particularly PCM signals, into analog signals, particularly PAM signals, and for translating analog signals into digital signals. The arrangement exhibits an analog store accommodating analog signals which appear in pulse frames in cyclical repetition and which are to be converted into digital signals. The analog store has an assigned signal output device putting out such digital signals, a signal acceptance device accepting digital signals to be converted into analog signals, and also an analog-digital transducer operating in accordance with the iterative principle. The transducer has a flow control; an intermediate register which can be controlled by the control signals produced by said transducer; a digital analog converter connected at the outlet side of said intermediate register; and a comparator comparing the analog signals given off by the digital analog converter with the analog signals stored in the analog store and which are to be converted into digital signals. Output from the intermediate register is controlled by the flow control. The flow control is laid out such that it releases the transfer of a digital signal received by the signal accommodation device and to be converted into an analog signal to the digital analog converter, and effectively switches the digital analog converter for converting the analog signal stored in the analog store into a digital signal with specific other actuation signals. The inputs of an output register of the signal output device are connected to the register levels of the intermediate register, and the outputs of the input register of the signal acceptance device are connected to the placement inputs of the register levels of the intermediate register. Such a circuit arrangement (German Offenlegungsschrift 2,534,109 incorporated by reference herein) merely requires one single analog digital transducer which is twice utilized within each pulse frame of the determining control impulses. This circuit arrangement is relatively inexpensive with respect to circuit layout since only one input register and one output register are required for the conversion of an analog signal into a digital signal and for the output of such a digital signal. The same is true for the accommodation of a digital signal to be converted into an analog signal and for the conversion of such a digital signal. The analog digital transducer can also be of conventional design.

The possibility of holding conference calls represents an often requested output characteristic, particularly in secondary or auxiliary exchange systems.

In telecommunication systems with analog connecting through, the conference sets required arranged in central position have a relatively simple circuit layout. If, however, as presumed in the present case, one deals with a PCM time multiplex telecommunication setup with digitally operating subscriber stations, a greater circuit layout expense must be made for the conference set. As the PCM words are coded according to a non-linear characteristic, the PCM words indeed cannot be readily added up to a summation word. Thus, for example, it is known for this purpose (German Offenlegungsschrift 1,918,100 corresponding to U.S. Pat. No. 3,612,772 and incorporated by reference herein) to convert the digital signals coming from the individual subscriber stations into analog signals, then to form an analog summation signal from the individual analog values and to finally transmit such a summation signal—after conversion into a digital signal—to the conference subscribers. Therefore within one pulse frame many summation signals are formed as conference subscribers take part in the conference call, whereby in each of the summation signals the call share of respectively one other of the conference subscribers is lacking.

The formation of these sums proceeds such that first the call shares of two subscribers are summed up respectively after one digital-analog conversion. The intermediate sum resulting therefrom is converted into a digital value and this intermediate sum again is converted back into an analog value and summed up with the call share of the next subscriber which was converted into an analog value, and so on, until finally a digital summation word is formed from the call shares of $n-1$ conference subscribers. This summation word is transmitted to the n-th subscriber.

The formation of the remaining summation words proceeds in a corresponding manner.

The known circuit arrangement cited requires three digital-analog converters, of which two are used for the digital-analog conversion before the intermediate summation or summation formation, and the third component of the coding device is used for the formation of the digital intermediate summation or summation signal. These digital-analog converters must operate very rapidly due to the multiple digital-analog conversion occurring within one pulse frame and are therefore correspondingly expensive.

SUMMARY OF THE INVENTION

It is an object of the invention to provide a less expensive circuit arrangement for the handling of conference calls.

This objective is inventively resolved in that a circuit arrangement of the initially mentioned type is utilized as a conference set of a telecommunication setup and the circuit arrangement has a number of input registers equal to the greatest possible number of conference subscribers. The content of each of the registers controlled by the specific actuation signals of the flow control is consecutively passed on to the digital-analog converter. An adding device is also provided and which is connected to the digital analog converter. The adding device forms an analog summation signal and controlled by the specific other actuation signals of the flow control including the digital-analog converter. The summation signal is converted into a digital signal. An output intermediate register is provided which is connected to the output register from where the digital summation signal is multiply transmitted in the time channels or slots allocated to the conference subscriber stations. In another embodiment of the invention, with conference subscribers of a maximum number n which can participate, the circuit arrangement is provided n times. $n-1$ input registers are provided in each signal accommodation device and which are respectively allocated to conference subscribers other than an allocated subscriber. Actuation signals of the flow control pass subscriber signals consecutively on to the digital-analog converter. An adding device connected to the digital-analog converter is also provided. The adding device forms an analog summation signal which, through control by other actuation signals of the flow control including the digital-analog converter, are converted into a digital signal. An output register takes over this digital value and respectively gives off its content during the time position allocated to that conference subscriber to whom it is allocated.

Thus, in the first version of the inventive circuit arrangement a single analog-digital converter, operating in accordance with the iterative principle, is required in conjunction with the sum formation originating from the digital signals of the individual subscribers. This analog-digital converter is utilized for the conversion of digital signals into analog signals and for the conversion of analog signals into digital signals within one pulse frame.

The sum formation thereby proceeds directly without the formation of intermediate sums as is the case in the known conference set. As a consequence thereof, a considerably lower operating speed is required for the digital-analog converter, which is a component of the digital-analog transducer in the inventive circuit arrangement, than would be the case in the digital-analog converters of the known conference set, if said transducer would also be operated such that for all conference subscribers, one and the same summation information is formed. Thus, each conference subscriber receives its own call share with the aid of this sum.

This last mentioned circumstance does not interfere in most cases. Should, however, the wish exist to respectively transmit summation signals to the individual conference subscribers wherein the summation signals no longer contain the share of the individual subscriber, the second version, although more expensive than the first with respect to operating speed of the digital-analog converters, has advantages.

DESCRIPTION OF THE PREFERRED EMBODIMENTS

Figure 1:
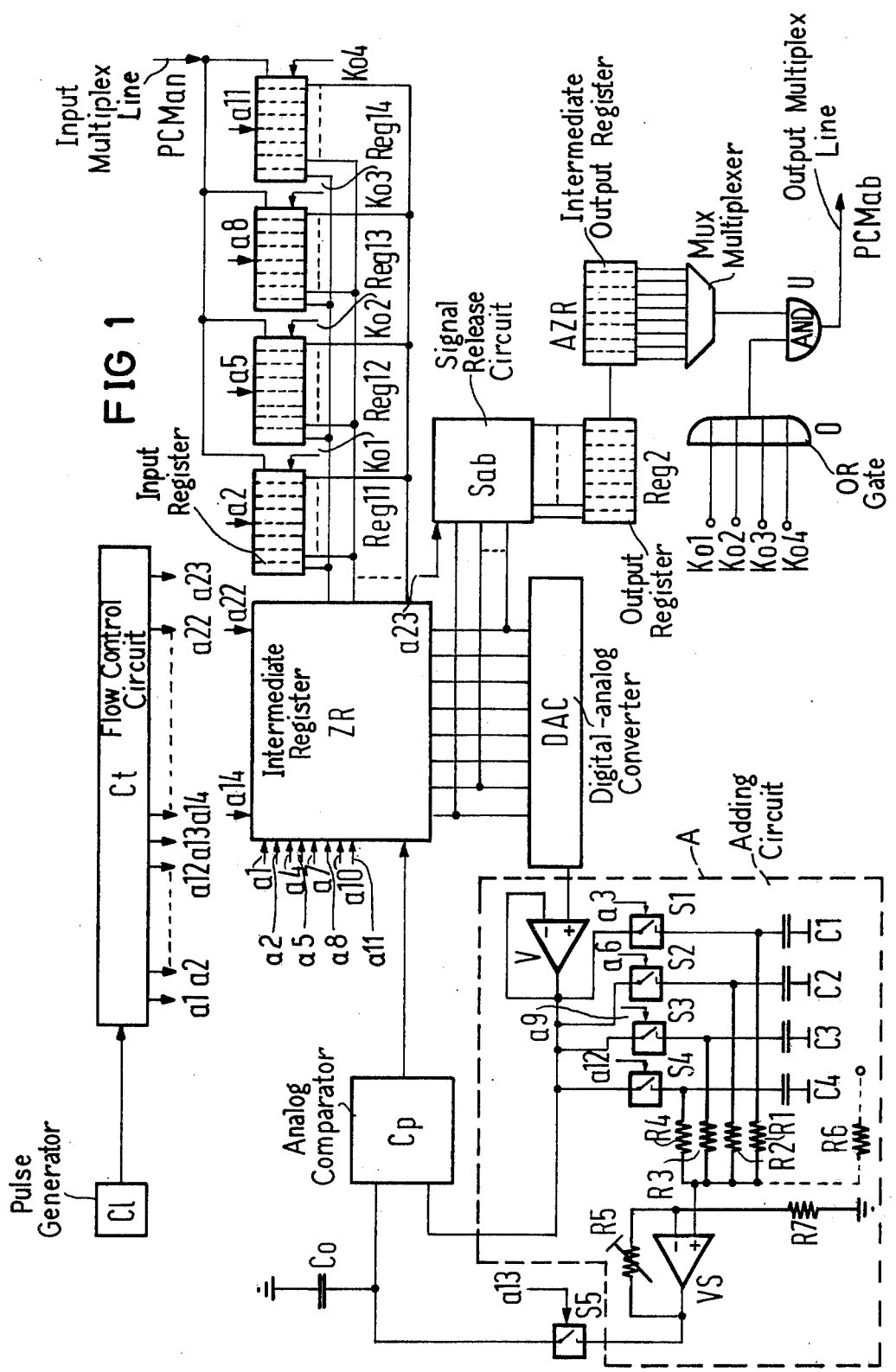
FIG. 1 illustrates a first version of the inventive circuit arrangement.

The circuit arrangement illustrated in FIG. 1 is a component of an exchange not more precisely illustrated here.

The circuit arrangement has a flow control circuit Ct stepped or switched by a pulse generator C1. The flow control circuit consecutively supplies actuation signals for the individual components of the circuit arrangement at its output a1 through a23.

One of these components is an intermediate register ZR, not more precisely illustrated here, which exhibits 8 register levels in the form of flip-flops according to the assumed 8 bit per PCM word.

These flip-flops can consecutively take over the content of input registers Reg 11 through Reg 14 present in the form of 8 bit PCM words. The number of these input registers corresponds with the maximum number of conference subscribers possible.

During the time slots of the time channels assigned to the respectively participating conference subscribers, the registers mentioned take over digital signals originating from the subscribers from an incoming time multiplex line PCMan. These digital signals are made ready for recording by means of release signals Ko1 through Ko4.

The outputs of the flip-flops of the intermediate register ZR are respectively connected with one of the inputs of a digital-analog converter DAC.

The output of the digital-analog converter DAC is connected to an input of an amplifier V, whose output again can be connected with one of the capacitors C1 through C4 via one of the switches S1 through S4. The switches S1 through S4 are also actuated by actuation signals supplied by flow control CT. The terminals of capacitors C1 through C4 away from ground are connected to an input of a summation amplifier VS in the form of an operational amplifier via high-ohmic impedances R1 through R4.

Between the output of this summation amplifier and the inverting amplifier input, a connection exists via a controllable impedance R5. Moreover, this amplifier input is connected to ground via impedance R7.

The output of the summation amplifier is connected to the terminal of a capacitor Co away from ground and is also connected to one input of an analog comparator Cp. The other input of this analog comparator is directly connected to the output of amplifier V. The output signal of the analog comparator Cp is conveyed to the intermediate register ZR as a release signal, dealt with more extensively below.

The outputs of the flip-flops of the immediate register ZR are also connected to the inputs of a signal release circuit Sab which causes a signal transfer from the intermediate register to an output register Reg2 connected thereto on the basis of an additional actuation signal of flow control Ct.

An output intermediate register AZR is allocated to the output register Reg2 which takes over the content of the output register once per pulse frame. A multiplexer Mux is connected to the outputs of the output intermediate register AZR with its parallel inputs, said multiplexer functioning as a parallel-series transducer. The series output of multiplexer Mux is connected to the one input of an AND-element U to whose other output the output of an OR-element O is connected. The release signals Ko1 through Ko4 already mentioned, are conveyed to the inputs of this OR element O. The release signals occur during the time positions of the time channels allocated to the conference subscribers.

The output of the AND-element U is connected to an outgoing time multiplex line PCMab.

Except for the multiple input registers Reg11 through Reg14, the analog signals provided during summation of individual analog signals sent by the digital-analog converter DAC and the circuit components in contact with said analog signals and the circuit components subordinate to the output register Reg2, the circuit arrangement described corresponds with the above described known circuit arrangement for converting analog signals into digital signals and digital signals into analog signals (German Offenlegungsschrift 2,534,109 incorporated by reference herein).

The mode of operation of the above described inventive circuit arrangement is more closely explained in the following.

The digital signals supplied by the conference subscribers reach the circuit arrangement illustrated on the incoming time multiplex line PCMan and reach the respectively correct input register Reg11 through Reg14 on the basis of the timed occurrence of the release signals Ko1 through Ko4.

Flow control Ct, respectively succeeding the start of the pulse frame, consecutively supplies actuation signals at its outputs a1 through a23.

The actuation signal given off at its output a1 effects a resetting of the flip-flops of the intermediate register ZR.

The actuation signal at output a2 of the flow control causes a takeover of the digital signal situated in the first input register Reg11 in the flip-flops of intermediate register ZR so that this digital signal is continuously connected to the inputs of the digital-analog converter DAC. When the occurrence of the actuation signal follows at the output a3 of the flow control, the analog signal provided by amplifier V reaches capacitor C1 via switch S1.

When the actuation signals appear at output a4 of the flow control, the flip-flops of the intermediate register ZR are again erased. Induced by the control signals at the outputs a5 through a12 of the flow control, corresponding processes consecutively repeat themselves in conjunction with the digital signals stored in the remaining input registers Reg12 through Reg14.

The actuation signal occurring at the output a13 of the flow control effects a closing of switch S5 so that now the amplifier VS can send the summation analog signal formed by the analog signals stored in the capacitors C1 through C4 to capacitor Co, whereby this summation signal is connected to an input of the analog comparator Cp.

The register stages of the intermediate register ZR are directly actuated by the subsequent actuation signals occurring at the outputs a14 through a22 of flow control Ct. These actuation signals release the influencing of the register stages by the output signal of the analog comparator. In this manner, a gradual approximation of the analog voltage given off by the digital-analog converter DAC to the summation analog voltage stored in capacitor Co proceeds in this manner in a conversion process (see, for example, German Offenlegungsschrift 2,315,896, FIG. 1; U.S. Pat. Nos. 3,234,544; and German Offenlegungsschrift 2,534,109 corresponding to U.S. Pat. 4,056,820; all incorporated by reference herein) also known as an iterative process, known per se, so that finally the digital value for ths summation analog voltage is present in the intermediate register.

With the occurrence of an actuation signal at the output a23 of the flow control, the digital signal stored in the intermediate register ZR is then finally transferred to the output register Reg2 by means of the signal output device Sab.

With the start of the subsequent pulse frame, a transfer of the digital signal results from the output register Reg2 to the output intermediate register AZR. Thus, the output register Reg2 is again available for the acceptance of a new digitally coded summation signal.

The outputs of the output intermediate register AZR are interrogated by bit through multiplexer Mux so that the digital signal stored in the output intermediate register AZR is conveyed in serial form to the AND element U. These bits reach the outgoing time multiplex line PCMab as a serial word if a signal is supplied by the OR element O. This proceeds several times at the time position of the time channels allocated to the conference subscribers on the basis of the release signals Ko1 through Ko4 reaching the input of the OR element.

Thus, the digitally coded summation signal is multiply transmitted per pulse frame, as desired.

If an indicator signal is to be provided when a conference subscriber is additionally connected, this can proceed in a simple manner in that an impulse sequence with, for example, an impulse period of 1s at an impulse width of 0.3 ms is conveyed to the summation amplifier via impedance R6.

Figure 2:
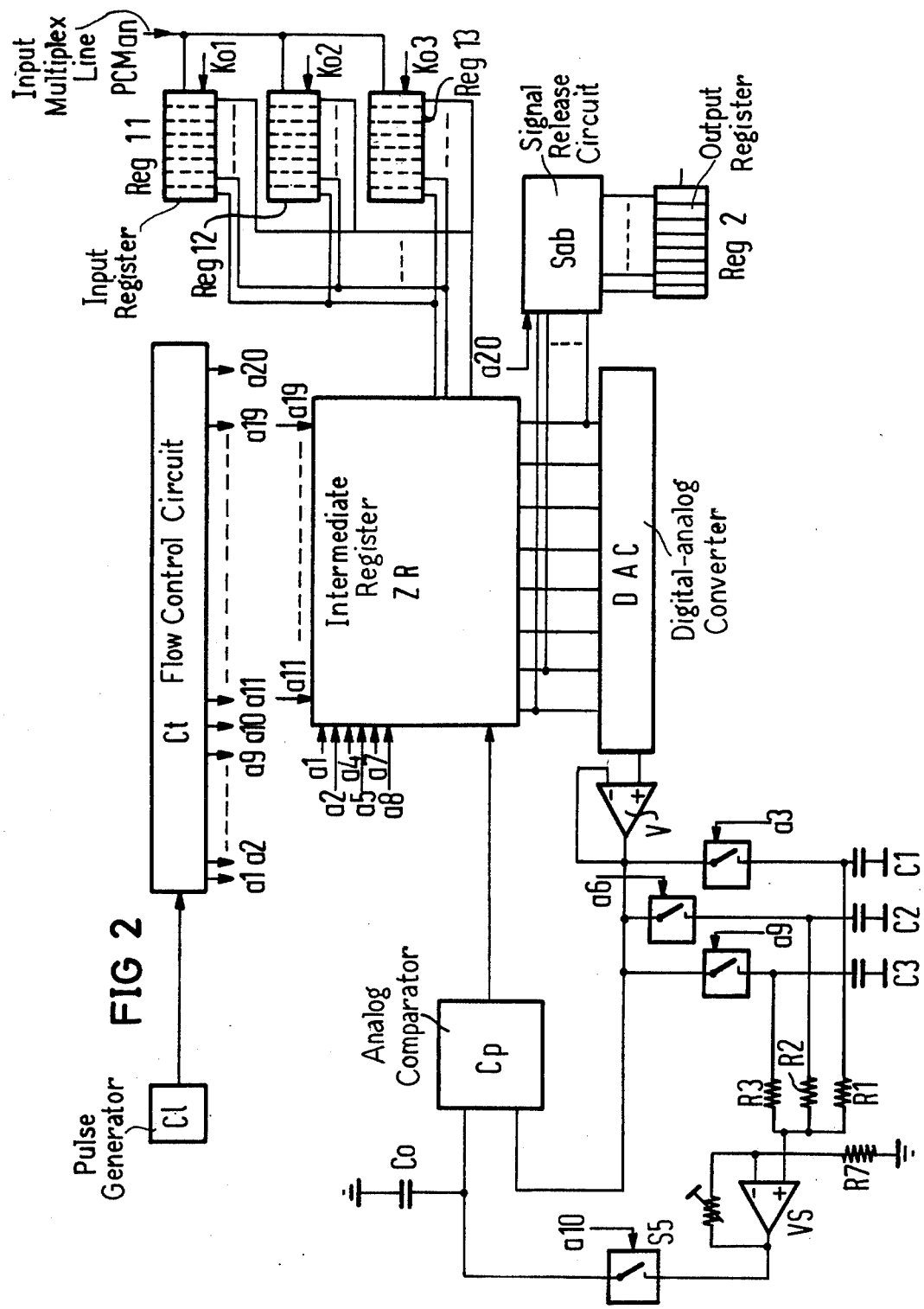
FIG. 2 shows a portion of a second version of the inventive circuit which relates to one subscriber.

FIG. 2 illustrates in the second embodiment of the invention a common portion of a conference set usable with four subscribers. Circuitry for one conference subscriber is shown and has many components which are identical with the arrangement in accordance with FIG. 1. Such components are here provided with the same reference symbols and are no longer more precisely explained.

The difference of the circuit arrangement in accordance with FIG. 2 in relation to that in accordance with FIG. 1 essentially consists of the presence of the $n-1=3$ input registers Reg11 through Reg13. When a conference connection is established these input registers are respectively allocated to the remaining conference subscribers other than that conference subscriber to which the circuit arrangement described is allocated, in that they are respectively made accessible by released signals Ko1 through Ko3 during the time positions allocated to these remaining conference subscribers. The function of the second embodiment of the inventive circuit arrangement is now more closely described with reference to FIG. 3.

Figure 3:
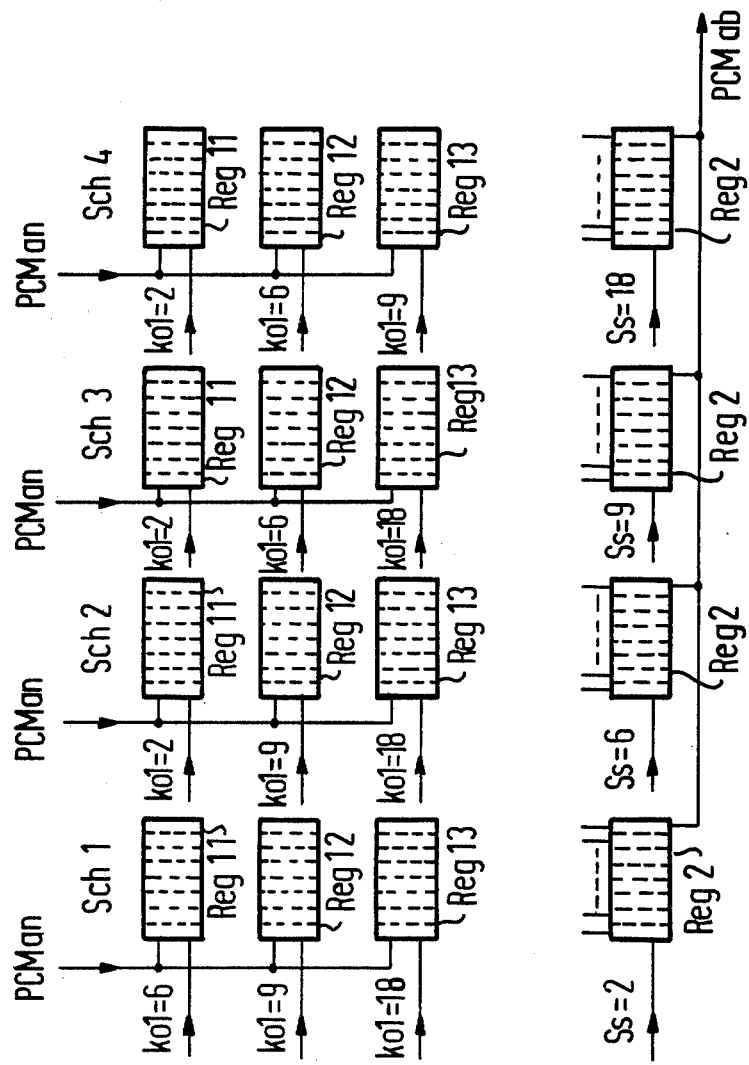
FIG. 3 schematically illustrates a conference set designed from components in accordance with FIG. 2 and laid out for a maximum of $n=4$.

FIG. 3 illustrates input and output registers of an inventive conference set partially illustrated in FIG. 2 for a maximum of four conference subscribers. This set consists of four circuit arrangements SCH1 through SCH4 each constructed in accordance with FIG. 2. Each circuit arrangement is allocated to a different one of the four conference subscribers.

The inputs of the input registers Reg11 through Reg13 of these circuit arrangements are respectively allocated to the remaining conference subscribers by a corresponding timed feed of release signals. Thus, in a circuit arrangement SCH1, the release signal Ko1=6 is conveyed to the input register Reg11, the release signal Ko1=9 is conveyed to register Reg12, and the release signal Ko1=18 is conveyed to register Reg13. Therefore, these registers are allocated to the remaining conference subscribers to which the time channels 6, 9 and 18 are allocated. In the circuit arrangement SCH2, the registers Reg11 through Reg13 are allocated to the conference subscribers in that sequence in which time channels 2, 9 and 18 are allocated, etc. etc.

The outputs of output registers Reg2 of the circuit arrangements SCH1 through SCH4 are connected to one another and are connected to the outgoing time multiplex line PCMab. The output from these registers proceeds on the basis of start signals Ss respectively occuring during the time slots of those time channels allocated to the corresponding conference subscriber. Thus, in the sample illustrated in FIG. 2, the transfer from the output register of circuit arrangement SCH1 proceeds during the time slots of time channel 2, in the circuit arrangement SCH2 during the time slots of time channel 6, in the circuit arrangement SCH3 during the time slots of time channel 9, and in the circuit arrangement SCH4 during the time slots of time channel 18.

The mode of operation of the inventive circuit arrangement is explained hereafter. The processes taking place in the individual circuit arrangements Sch1 through Sch4 are described with the aid of the circuit arrangement of FIG. 1 since corresponding processes take place in the remaining circuit arrangements.

The digital signals supplied by the conference subscribers reach the circuit arrangement on an incoming time multiplex line PCMan and respectively reach the correct input registers Reg11 through Reg13 due to the timed occurrence of release signals Ko1 through Ko3, for example, in the circuit arrangement Sch1 during the time positions of time channels 6, 9 and 18.

Actuation signals are consecutively supplied after the pulse frame start by the flow control Ct of such a circuit arrangement at its outputs a1 through a20, respectively.

The actuation signal given off at the output a1 of the flow control effects a resetting of the flip-flops of the intermediate registers ZR.

The actuation signal at the output a2 of the flow control causes a transfer of the digital signal situated in the first input register Reg11 into the flip-flops of intermediate register ZR such that this digital signal is continuously connected to the inputs of the digital-analog converter DAC. With a subsequent appearance of the actuation signal at the output a3 of the flow control, the analog signal is correspondingly output via the amplifier V and reaches capacitor Ct via switch S1. The flip-flops of the intermediate register ZR are again erased when the actuation signal at output a4 of the flow control appears. Corresponding processes in conjunction with the digital signals stored in the remaining input registers Reg12 and Reg13 caused by the control signals at the outputs a5 through a9 of flow control are consecutively repeated.

The actuation signal appearing at output a10 of the flow control effects a closing of switch S5 so that now the amplifier VS can output the summation analog signal to capacitor Co, said summation analog signal being formed by the analog signals stored in capacitors C1 through C3. This summation signal is connected to an input of the analog comparator Cp. The register stages of the intermediate register ZR are directly actuated by the subsequent actuation signals occurring at the outputs a14 through a19 of flow control Ct. These register stages cause a release of the influencing of the register stages by the output signal of the analog comparator. A gradual approximation or approaching of the analog voltage emitted by the digital analog converter DAC to the summation analog voltage stored in capacitor Co occurs. This is known as the iterative process, known per se (see, for example, German Offenlegungsschrift 2,315,896, FIG. 1; U.S. Pat. No. 3,234,544; and German Offenlegungsschrift 2,534,109 corresponding to U.S. Pat. No. 4,056,820; all incorporated herein by reference), so that finally the digital value for this summation analog voltage is in the intermediate register.

With the appearance of an actuation signal at the output a20 of the flow control, the digital signal stored in the intermediate register ZR is then finally transferred to the output register Reg2 by means of the signal output device Sab.

Thus, the digital value of a summation voltage is present in this output register Reg2 of circuit arrangement Sch1. This summation voltage comprises the call shares of those subscribers to which time channels 6, 9 and 18 are allocated.

The registers of the remaining circuit arrangements Sch2 through Sch4 of the circuit arrangement in accordance with FIG. 2 correspondingly contain digitally illustrated summation voltage values from the individual signal shares of three other conference subscribers, respectively. These summation voltage values are output to the outgoing time multiplex line PCMab during the time positions of time channels 2, 6, 9 and 18 caused by the start signals Ss, depending on which circuit arrangement Sch1 through Sch4 the output register Reg2 belongs.

Thus, summation voltages are transmitted to the individual conference subscribers which can be reached via this time multiplex line in their respectively allocated time channels. These summation voltages which, as desired, do not contain their own signal share.

In each of the circuit arrangements Sch1 through Sch4, the described processes of the three digital-analog conversions, the summation formation, and the subsequent analog digital conversion respectively take place in cyclical repetition within one pulse frame.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A telecommunication conference circuit arrangement for use with a given maximum number n of conference subscribers each originating a digital signal on a multiplex input line, comprising:
   (a) a signal acceptance means connected to the input line for accepting digital signals for conversion into analog signals;
   (b) an intermediate register means connected to the signal acceptance means;
   (c) a digital-analog converter connected to an output of the intermediate register means;
   (d) an analog store means for storing an analog summation signal;
   (e) an analog comparator means for comparing analog signals from the digital-analog converter with the analog summation signal stored in the analog store;
   (f) signal allocation output device means connected to the output of the digital-analog converter;
   (g) said signal acceptance means comprising n input registers, each input register being allocable to one of the conference subscribers and reading in corresponding digital signals from the subscriber;
   (h) adding device means connected to an output of the digital-analog converter for forming the analog summation signal which is stored in the analog store from individual analog signals corresponding to each of the individual subscriber digital signals;
   (i) said signal allocation output device means including an intermediate and output register means for transmitting the digital summation signal in respective time slots for the respective conference subscriber stations;
   (j) clocked flow control means for creating a succession of clocked actuating signals for actuating in a given flow pattern the signal acceptance means, intermediate register means, digital-analog converter, adding device means, analog store means, analog comparator means, and signal allocation output device means; and
   (k) said analog store, analog comparator, intermediate register, flow control means and digital-analog converter forming an analog-digital transducer means operating by iteration to digitalize the analog summation signal and store it in the intermediate register.

2. The arrangement of claim 1 wherein said adding device means has an analog store corresponding to each of the input registers.

3. A method of operating a telecommunication conference circuit connected to a multiplex line having a given number of subscribers connected thereto, each subscriber creating a digital signal in a given time slot, comprising the steps of:
   (a) providing an input register for each subscriber and reading the corresponding digital signal for each subscriber into the corresponding input register;
   (b) reading the digital signal for one subscriber into an intermediate register and a connected digital-analog converter in order to create an analog signal;
   (c) storing the analog signal;
   (d) repeating the steps of reading, converting, and storing for each input register to create stored analog signals for each of the subscribers;
   (e) summing and storing the stored analog signals to create a stored analog summation signal;
   (f) digitalizing the stored analog summation signal by iteration and placing it in the intermediate register by providing a comparator which compares the stored analog summation signal with analog signals from the digital-analog converter; and
   (g) multiply feeding the digitalized analog summation signal to an output multiplex line according to the time slot for the subscribers.

4. A telecommunication conference circuit arrangement for use with a maximum number n of conference subscribers each originating a digital signal on a multiplex input line, comprising: n circuits each having
   (a) a signal acceptance means connected to the input line for accepting digital signals for conversion into analog signals;
   (b) an intermediate register means connected to the signal acceptance means;
   (c) a digital-analog converter connected to an output of the intermediate register means;
   (d) an analog store means for storing an analog summation signal;
   (e) an analog comparator means for comparing analog signals from the digital-analog converter with the analog summation signal stored in the analog store;
   (f) signal allocation output device means connected to the output of the digital-analog converter;
   (g) said signal acceptance means comprising $n-1$ input registers, each input register being selectively allocable to one of the conference subscribers other than an allocated subscriber, and reading in corresponding digital signals;
   (h) adding device means connected to an output of the digital-analog converter for forming the analog summation signal which is stored in the analog store from individual analog signals corresponding to each of the individual subscriber digital signals except the allocated subscriber;
   (i) said signal allocation output device means including an intermediate and output register means for transmitting the digital summation signal in a respective time slot of the allocated subscriber;
   (j) clocked flow control means for creating a succession of clocked actuating signals for actuating in a given flow pattern the signal acceptance means, intermediate register means, digital-analog converter, adding device means, analog store means, analog comparator means, and signal allocation output device means; and
   (k) said analog store, analog comparator, intermediate register, flow control means and digital-analog converter forming an analog-digital transducer means operating by iteration to digitalize the analog summation signal and store it in the intermediate register.

5. The arrangement of claim 4 wherein said adding device means has $n-1$ analog stores.

6. A method of operating a telecommunication conference circuit connected to a multiplex line having a given number n of subscribers connected thereto, each subscriber creating a digital signal in a given time slot, comprising the steps of: providing n circuits and within each circuit
   (a) providing $n-1$ input registers and reading the corresponding digital signal for each subscriber except an allocated subscriber into the corresponding input register;
   (b) reading the digital signal for one subscriber into an intermediate register and a connected digital-analog converter in order to create an analog signal;
   (c) storing the analog signal;
   (d) repeating the steps of reading, converting, and storing for each input register to create stored analog signals for each of the subscribers except the allocated subscriber;
   (e) summing and storing the stored analog signals to create a stored analog summation signal;
   (f) digitalizing the stored analog summation signal by iteration and placing it in the intermediate register by providing a comparator which compares the stored analog summation signal with analog signals from the digital-analog converter; and
   (g) feeding the digitalized analog summation signal to an output multiplex line in the time slot of the allocated subscriber.

* * * * *